United States Patent [19]

Miura

[11] 4,026,374
[45] May 31, 1977

[54] BICYCLE WITH AN INTERNAL COMBUSTION ENGINE

[75] Inventor: Seishi Miura, Wako, Japan

[73] Assignee: Honda Giken Kogyo Kabushiki Kaisha, Tokyo, Japan

[22] Filed: Apr. 9, 1976

[21] Appl. No.: 675,291

[52] U.S. Cl. .............................. 180/33 C
[51] Int. Cl.² ............... B62D 61/02; B62M 7/02
[58] Field of Search ............ 180/33 C, 33 R, 33 A, 180/33 B, 33 D, 65 R, 65 A; 123/97 R

[56] References Cited

UNITED STATES PATENTS

| | | | |
|---|---|---|---|
| 552,312 | 12/1895 | Battey | 180/33 C |
| 692,942 | 2/1902 | Strickland | 180/33 C |
| 1,283,068 | 10/1918 | Burton | 123/97 R |
| 2,212,279 | 8/1940 | Steinlein et al. | 180/33 C |
| 2,583,499 | 1/1952 | Teegen | 180/33 C |
| 3,513,928 | 5/1970 | Emmons | 180/65 R |
| 3,773,131 | 11/1973 | Jaulmes | 180/33 C |
| 3,939,932 | 2/1976 | Rosen | 180/33 C |

Primary Examiner—Philip Goodman
Assistant Examiner—Jack D. Rubenstein

[57] ABSTRACT

A bicycle comprising a frame having a front wheel, a rear wheel and a pedal crank shaft connected to the rear wheel. An internal combustion engine is also connected to the rear wheel. A gear train comprising an input gear, an output gear, and an intermediate gear in mesh with the two gears is interposed between the pedal crank shaft and a driving sprocket connected to the rear wheel, the intermediate gear being loosely and rotatably mounted on a rotatable supporting shaft such that by driving the pedal crank shaft in rotation the supporting shaft can be turned due to frictional engagement by the input and intermediate gears. A throttle control member for the engine is connected to an end portion of the supporting shaft so that the member is operated by turning of the shaft. The supporting shaft is provided on one side with a dashpot coupled with the shaft so that rotation of the shaft is dampened.

9 Claims, 6 Drawing Figures

BICYCLE WITH AN INTERNAL COMBUSTION ENGINE

FIELD OF THE INVENTION

This invention relates to a bicycle with an internal combustion engine of the type comprising a frame having a front wheel, a rear wheel and a pedal crank shaft connected, for manual driving, to the rear wheel, the internal combustion engine being connected, for mechanical power drive to the rear wheel.

BACKGROUND OF THE INVENTION

The Applicant has previously proposed an arrangement in this type of bicycle in which a throttle control for the engine is effected depending on the rotation of the pedal crank shaft.

An object of this invention is to provide a bicycle with an internal combustion engine wherein such throttle control can be carried out simply and reliably.

SUMMARY OF THE INVENTION

According to the invention, in a bicycle having a frame with a front wheel, a rear wheel and a pedal crank shaft connected to the rear wheel, an internal combustion engine also being connected to the rear wheel, an improvement comprises a gear train including an input gear, an output gear and an intermediate gear in mesh with the input and output gears, said gear train being interposed between the pedal crank shaft and a driving sprocket connected to the rear wheel, the intermediate gear being loosely and rotatably mounted on a rotatable supporting shaft, such that by a driving rotation of the pedal crank shaft, the supporting shaft can be turned due to frictional engagement between the input and intermediate gears, and a throttle control member for the engine connected to an end portion of the supporting shaft so that the throttle control member can be operated by turning of the shaft.

According to a feature of the invention, in the above arrangement, the supporting shaft is provided on one side with a dashpot means coupled to the shaft so that turning of the shaft can be controlled by the dashpot means.

One embodying example of this invention will now be explained with reference to the accompanying drawings.

DETAILED DESCRIPTION

Figure 1:
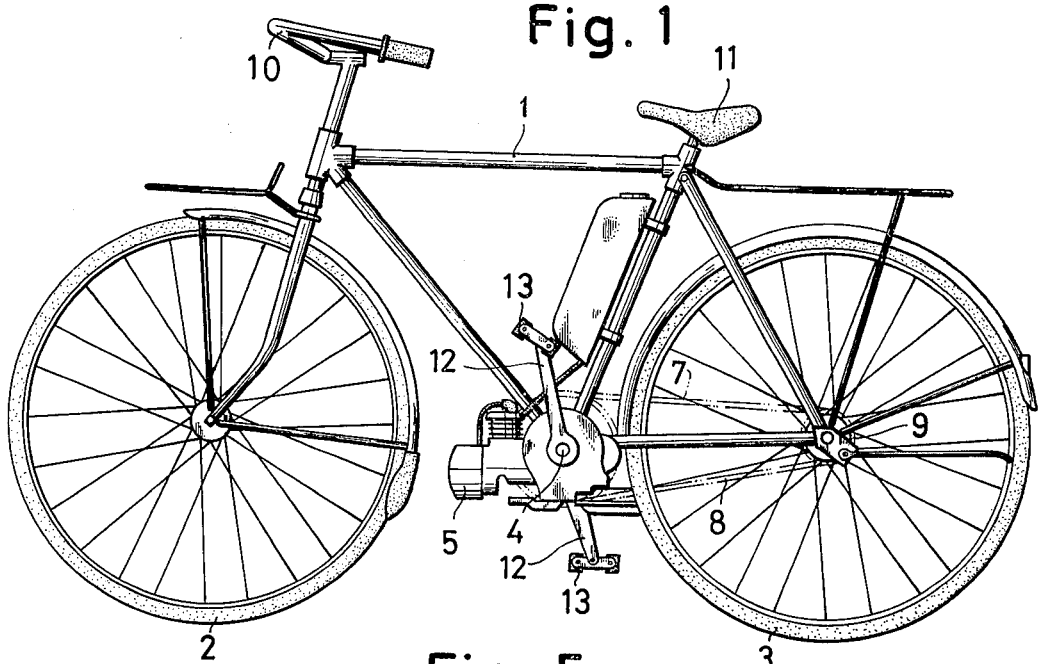
FIG. 1 is a elevational side view of one embodiment of a bicycle according to this invention.

Referring to the drawings, numeral 1 denotes a frame provided with a front wheel 2, a rear wheel 3, and between them a pedal crank shaft 4 connected, for manual drive, to the rear wheel 3 so as to form a manual bicycle type as a whole. Additionally, the frame 1 is provided with an internal combustion engine 5 such as a gasoline engine or the like which, for mechanical power drive is drivingly connected in parallel with the pedal crank shaft 4 to the rear wheel 3. The drive from the engine to the rear wheel can be effected by any suitable conventional transmission such as, for example, a frictional wheel driven by the engine and in frictional driving contact with the periphery of the rear wheel.

The pedal crank shaft 4 is inserted through a tubular hanger 6 provided at the lower middle portion of the frame 1 and is provided at its end portion with a driving sprocket 7 is connected through a chain 8 to a rear wheel sprocket 9 on the axle of the rear wheel 3.

Referring to the drawings, numeral 10 denotes a steering bar provided at the front portion of the frame 1 and numeral 11 denotes a driver's seat mounted on the rear thereof, and the pedal crank shaft 4 has at both its ends pedal arms 12, projecting therefrom and pedals 13 are mounted on the ends thereof. The above construction is not different from the conventional construction.

A tubular shaft 14 is rotatably mounted on the pedal crank shaft 4 and the driving sprocket 7 is secured to an end portion of the tubular shaft 14. An input gear 15 and an output gear 16 are respectively mounted on the crank shaft 4 and the tubular shaft 14, so as to be rotatable therewith and an intermediate gear 18 is in mesh with gears 15, 16 and is mounted on a supporting shaft 17 disposed on one side of shaft 4. Thus a gear train composed of gears 15, 18, 16 is formed so that rotation of the pedal crank shaft 4 can be transmitted to the rear wheel 3 through the gear train, tubular shaft 14, sprocket 7 and sprocket 9. The supporting shaft 17 is supported at both ends by bearings 19 so as to be rotatable and the intermediate gear 18 is loosely mounted on the supporting shaft 17, with a slight gap being left therebetween, as to be rotatable. As a result, when the input gear 15 transmits a large torque to the intermediate gear 18 upon rotation of the pedal crank shaft 4, that is, when a load exists on the output side, the intermediate gear 18 is subjected to a pushing force from the input gear 15 in a radial direction; thereby the gear 18 is brought into pressure contact with the supporting shaft 17, so that by frictional engagement the shaft 17 can be rotated accordingly.

Figure 4:
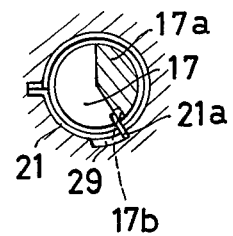
FIG. 4 is a sectional side view taken along line IV — IV in FIG. 2.

Furthermore, the supporting shaft 17 has at its end portion a lever-type throttle operation member 28 secured thereto by means of a screw 20 and connected to a throttle control member 30 in turn connected to a throttle valve (not shown) of the engine 5, so that by the foregoing turning of the shaft 17, the throttle valve can be subjected to an opening operation through the operation member 28. The shaft 17 is acted on at its other end by a coil-type return spring 21. This spring 21 is so arranged that, as shown in FIG. 4, a free end 21a thereof, bent to project inwards, is brought into abutment with an end surface of a segmental form of projecting portion 17a formed on the end portion of the shaft 17 and is movable within a predetermined slot 29 formed in the inner peripheral surface of a surrounding casing wall. The end surface of the projection portion 17a is provided with a slightly recessed escape portion 17b, so that the shaft 17 can be freely turnable within the angular range of this escape portion 17b without receiving any action of the spring 21. In other words, on rotation of the pedal crank shaft 4, even when there does not exist the foregoing large torque transmission, the supporting shaft 17 can be given a slight turning movement within this angle range and consequently the throttle valve of the engine 5 can be given a slight opening in accordance therewith.

According to a feature of this invention, a dashpot means 22 associated with the supporting shaft 17 is provided on one side of the shaft 17 for damping or controlling the turning of the supporting shaft 17. Thereby the opening and closing of the throttle valve of the engine 5 moving with the shaft 17 can be controlled and fluctuation of the valve can be prevented.

Figure 5:
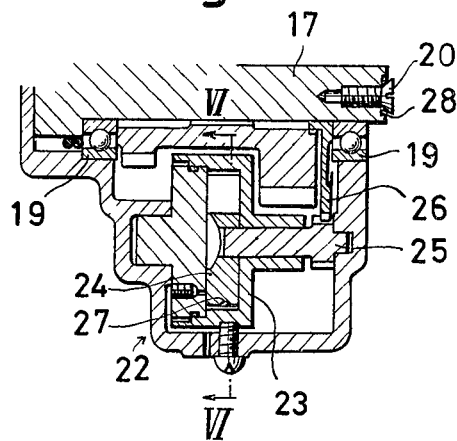
FIG. 5 is a sectional side view of a modified portion thereof.
Figure 6:
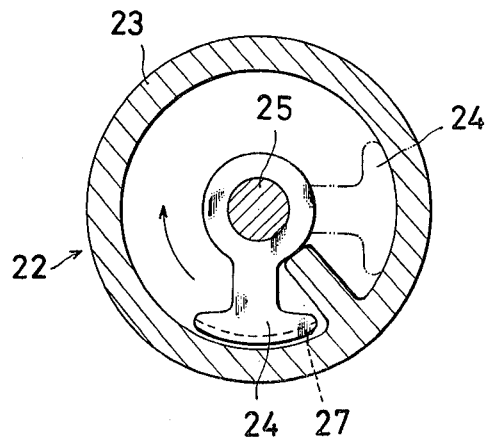
FIG. 6 is a sectional view taken along line VI — VI in FIG. 5.
Figure 2:
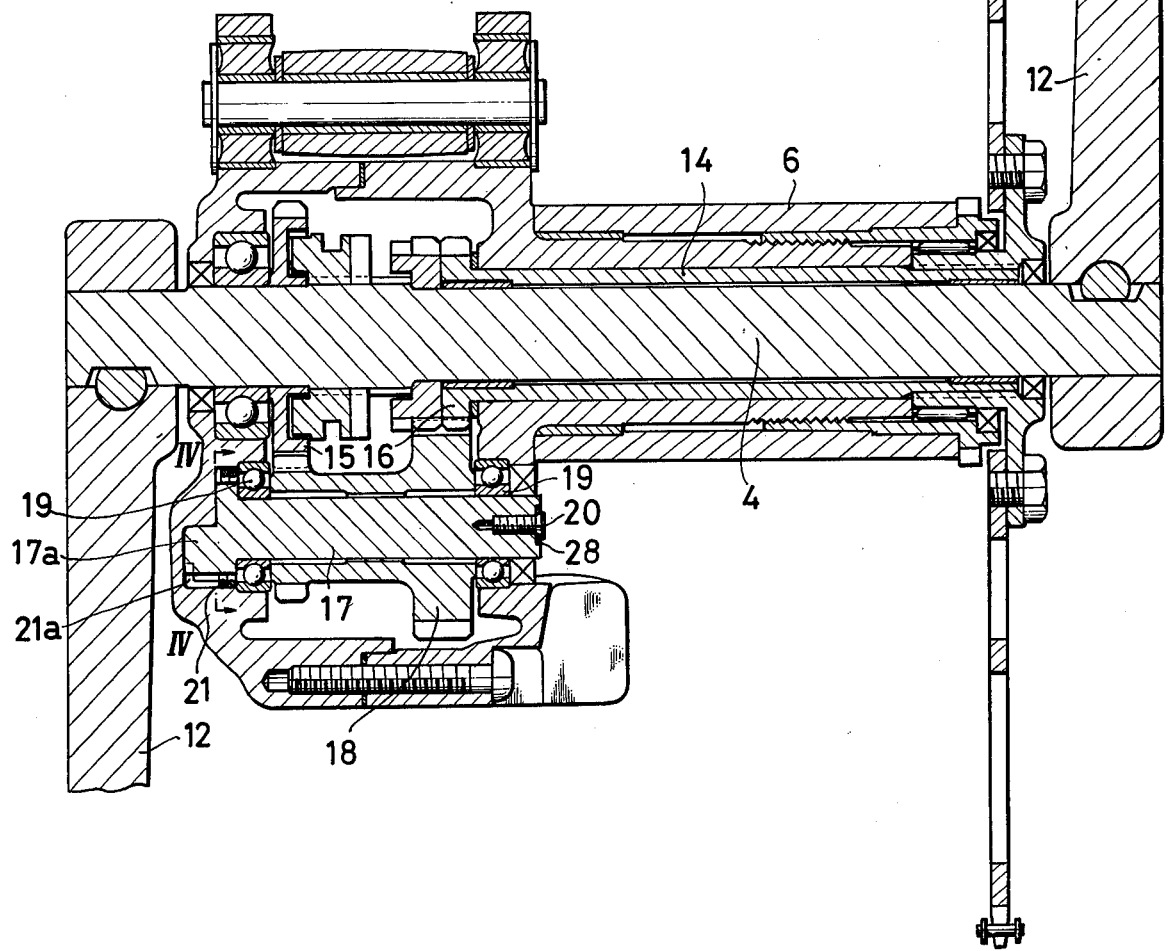
FIG. 2 is an enlarged sectional side view of a major portion thereof.
Figure 3:
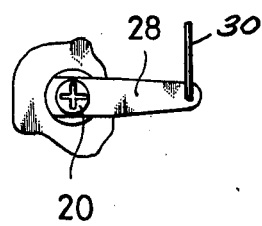
FIG. 3 is a front view of a portion thereof.

FIGS. 5 and 6 show one embodiment of such dashpot means in detail. Namely, the dashpot means 22 comprises a sealed casing 23 filled with silicon oil and enclosing a rotor 24 therein. A shaft 25 of the rotor 24 is connected to the supporting shaft 17 through a gear train 26. Thus, the supporting shaft 17 and, accordingly, the throttle valve of the engine 5 receives through the rotor 24 a resistance force produced by the silicon oil within the casing 23. Thereby the opening and closing operations of the throttle valve are damped or controlled. The casing 23 is formed such that the diameter of the inner peripheral surface thereof gradually decreases in one direction of rotation the rotor 24, so that as the rotating angle of the rotor 24 increases, that is, as the open degree of the throttle valve increases, the resistance action by the silicon oil is increased. Referring to the drawings, numeral 27 denotes a circumferentially directional guide groove formed in the outer peripheral surface of the rotor 24.

Thus, according to this invention, only when the pedal crank shaft transmits a torque to the rear wheel will the input gear act to turn, through the intermediate gear, the supporting shaft so as to give an opening operation to the throttle valve of the engine. Thereby, the output power of the engine can be always automatically so controlled as to correspond to the torque and driving of the vehicle can be safe and reliable. According to the second feature of the invention, the rotation of the supporting shaft is controlled by the dashpot means, so that fluctuation of the rotating force acting on the supporting shaft can be damped thereby and the operation of the throttle valve, and accordingly, the operation of the engine can be stable.

What is claimed is:

1. In a bicycle having a frame, a front wheel, a rear wheel, a pedal crank shaft connected to the rear wheel for manual drive thereof, and an internal combustion engine connected to the rear wheel for power drive thereof, an improvement comprising a gear train interposed between said pedal crank shaft and said rear wheel, a rotatable supporting shaft, means on said rotatable supporting shaft for frictionally engaging said gear train to drive said shaft, and means coupled to said shaft for throttle control of the engine, said means for frictionally engaging the gear train being loosely mounted on the supporting shaft for causing frictional engagement after a pre-determined torque is transmitted by the pedal crank shaft to the rear wheel.

2. The improvement as claimed in claim 1 wherein said means coupled to said shaft for throttle control of the engine comprises a throttle control member.

3. The improvement as claimed in claim 2 wherein said means coupled to said shaft for throttle control of the engine further comprises a link secured to the supporting shaft, said throttle control member being pivotably connected to said link.

4. The improvement as claimed in claim 3 comprising spring means acting on said supporting shaft for opposing angular movement thereof.

5. The improvement as claimed in claim 4 comprising means providing limited play between said supporting shaft and said spring means.

6. The improvement as claimed in claim 5 comprising stop means acting on said spring means for limiting the angular movement of said supporting shaft.

7. The improvement as claimed in claim 1 comprising dashpot means acting on said supporting shaft for damping rotation of said shaft.

8. The improvement as claimed in claim 7 wherein said dashpot means comprises a rotor interposed between said supporting shaft and the throttle control means, a sealed casing enclosing said rotor, and a liquid medium contained in said casing and opposing rotation of said rotor.

9. The improvement as claimed in claim 8 wherein said casing has an inner peripheral surface with a gradually decreasing diameter in one direction of rotation of said rotor.

* * * * *